US010537203B2

(12) United States Patent
Van Boxtel et al.

(10) Patent No.: US 10,537,203 B2
(45) Date of Patent: Jan. 21, 2020

(54) APPARATUS FOR PREPARING A BEVERAGE AND A DECOCTION DEVICE (71) Applicant: J.M. DE JONG DUKE AUTOMATENFABRIEK B.V., Sliedrecht (NL)

(72) Inventors: Jaap Jozua Van Boxtel, Ermelo (NL); Wouter De Boer, Enschede (NL); Andreas Jacobus Louis Nijsen, Enschede (NL)

(73) Assignee: J.M. DE JONG DUKE AUTOMATENFABRIEK B.V., Sliedrecht (NL)

( * ) Notice: Subject to any disclaimer, the term of this patent is extended or adjusted under 35 U.S.C. 154(b) by 0 days.

(21) Appl. No.: 14/443,285

(22) PCT Filed: Nov. 14, 2013

(86) PCT No.: PCT/NL2013/050821
§ 371 (c)(1),
(2) Date: May 15, 2015

(87) PCT Pub. No.: WO2014/077687
PCT Pub. Date: May 22, 2014

(65) Prior Publication Data
US 2015/0289705 A1    Oct. 15, 2015

(30) Foreign Application Priority Data
Nov. 16, 2012  (NL) ..................................... 2009833

(51) Int. Cl.
*A47J 31/40*    (2006.01)
*A47J 31/36*    (2006.01)

(52) U.S. Cl.
CPC ............. *A47J 31/405* (2013.01); *A47J 31/36* (2013.01)

(58) Field of Classification Search
CPC .... A47J 31/36; A47J 31/3614; A47J 31/3619; A47J 31/405
(Continued)

(56) References Cited

U.S. PATENT DOCUMENTS

| 4,111,108 A | 9/1978 | Moser |
| 4,681,028 A | 7/1987 | Schmed et al. |

(Continued)

FOREIGN PATENT DOCUMENTS

| BE | 745 939 | 7/1970 |
| EP | 0 154 206 A2 | 9/1985 |

(Continued)

OTHER PUBLICATIONS

International Search Report with Written Opinion for Application No. PCT/NL2013/050821 dated Mar. 10, 2014.
(Continued)

*Primary Examiner* — Dana Ross
*Assistant Examiner* — James F Sims, III
(74) *Attorney, Agent, or Firm* — Jenkins, Wilson, Taylor & Hunt, P.A.

(57) ABSTRACT

An apparatus for preparing a beverage comprises a decoction device (5) which comprises a decoction body (50) with a chamber Avail (53) inside which a decoction chamber (54) extends axially between a pair of bottoms (51,52) lying opposite each other. The chamber wall is provided locally with a filling opening (55) for admitting into the decoction chamber at least one ingredient for the beverage to be prepared. The decoction device is coupled to drive means which during operation impart a preparation cycle to the decoction device. A first bottom (51) moves closer to a second bottom (51) here in a first direction from a first starting position. Between a second and a third state the decoction body (50) performs a displacement in the first
(Continued)

direction in order to carry the inlet opening (55) outside the decoction chamber. In a third ejecting state the first bottom lies outside the decoction body.

14 Claims, 9 Drawing Sheets (58) Field of Classification Search
USPC .......................... 99/289 R, 300, 302 P, 302 R
See application file for complete search history.

(56) References Cited

U.S. PATENT DOCUMENTS

| | | | |
|---|---|---|---|
| 4,852,472 A | | 8/1989 | In-Albon et al. |
| 4,885,986 A | * | 12/1989 | Grossi ................. A47J 31/3619 |
| | | | 99/289 R |
| 5,228,383 A | | 7/1993 | Landais et al. |
| 5,275,089 A | | 1/1994 | Armellin |
| 5,333,537 A | | 8/1994 | Lüssi et al. |
| 2006/0266224 A1 | * | 11/2006 | Hammad ............... A47J 31/545 |
| | | | 99/279 |
| 2007/0012196 A1 | | 1/2007 | Sato |
| 2011/0212236 A1 | | 9/2011 | Nguyen et al. |

FOREIGN PATENT DOCUMENTS

| | | |
|---|---|---|
| EP | 0 202 517 A1 | 11/1986 |
| EP | 0 299 399 A2 | 1/1989 |
| EP | 0 309 780 A1 | 4/1989 |
| EP | 0 484 277 A1 | 5/1992 |
| EP | 0 528 758 A1 | 2/1993 |
| EP | 0 659 377 A1 | 6/1995 |
| EP | 2931090 A1 | 10/2015 |
| JP | S52146362 A | 12/1977 |
| JP | S6427516 A | 1/1989 |
| JP | 2007-020605 A | 2/2007 |
| JP | 2007-094869 A | 10/2007 |
| JP | 2013521059 A | 6/2013 |
| JP | 2014509912 A | 4/2014 |
| JP | 2016501077 A | 1/2016 |
| KR | 20150109335 A | 10/2015 |
| WO | WO 2012/134280 A1 | 10/2012 |
| WO | WO-2012134280 A1 * 10/2012 ........... A47J 31/3614 |

OTHER PUBLICATIONS

International Preliminary Report on Patentability corresponding to International Application Serial No. PCT/NL2013/050821 dated May 19, 2015.
Japanese Search Report corresponding to Japanese Patent Application No. 2015-542990 dated Aug. 31, 2017; retrieved from Global Dossier on Oct. 23, 2018.
Netherlands Search Report corresponding to Netherlands Patent Application No. 2009833 dated Sep. 16, 2015; retrieved from Global Dossier on Oct. 23, 2018.
Office Action corresponding to Japanese Patent Application No. 2015-542990 dated Jul. 31, 2018. [Drafted Jul. 20, 2018].
Office Action corresponding to European Patent Application Serial No. 13801889.0 dated Oct. 1, 2018; retrieved from Global Dossier on Oct. 23, 2018.
Office Action corresponding to Japanese Patent Application No. 2015-542990 dated Aug. 29, 2017.

* cited by examiner

APPARATUS FOR PREPARING A BEVERAGE AND A DECOCTION DEVICE

The present invention relates to an apparatus for preparing a beverage provided with a decoction device which comprises a decoction body with a chamber wall inside which a decoction chamber extends axially between a pair of bottoms lying opposite each other, which bottoms are received for axial movement inside the chamber wall, wherein the chamber wall is provided locally with a filling opening for admitting into the decoction chamber at least one ingredient for the beverage to be prepared, wherein the decoction chamber is provided with inlet means for admitting a liquid optionally under increased pressure and temperature and with dispensing means for dispensing a beverage prepared from the liquid and the at least one ingredient, and wherein the decoction device is coupled to drive means which during operation impart a preparation cycle to the decoction device, which preparation cycle comprises a first state in which the filling opening is situated between the bottoms and opens into the decoction chamber, which preparation cycle comprises a second state in which the bottoms have moved closer to each other inside the chamber wall and the filling opening is located in a first direction outside the decoction chamber and wherein the liquid is guided through the decoction chamber, and which preparation cycle comprises a third state in which a space between the two bottoms lies at least substantially wholly outside the decoction body in order to rid this latter of a possible residue of the at least one ingredient.

Such a device is known from European patent application EP 659377 and is particularly suitable for preparing espresso coffee, for which purpose hot water is guided under increased pressure through the decoction chamber using pump means provided for the purpose after a quantity of ground coffee has been introduced therein. This known device is a fully automatic machine with a decoction device, also referred to as decoction group, which performs a number of successive steps fully automatically in order to prepare the desired beverage. The known decoction device comprises a decoction body in the form of a hollow cylinder with a chamber wall inside which a pair of pistons is axially movable in close-fitting manner in order to thereby form bottoms of a decoction chamber lying opposite each other.

An opening with supply means for ground coffee powder is situated in the chamber wall. Although the known device is not configured for this purpose, another ingredient such as tea powder or chocolate powder suitable for an extracting or dissolving process can be used in similar manner. The preparation of the beverage takes place fully automatically in a number of successive stages. The decoction device is provided for this purpose with mechanical drive means in the form of a spindle or worm wheel which is driven by an electric motor and which engages directly on the chamber wall. In a first state the two bottoms lie apart and the supply opening is situated therebetween. In this state a measured quantity of coffee powder is admitted via the supply opening into the decoction chamber. The spindle then carries the chamber wall with the opening beyond a fixed one of the two bottoms, wherein the chamber wall displaces a movable one of the two bottoms by means of a protrusion provided for this purpose. The decoction chamber is now fully closed and the ingredient lies clamped between the two bottoms and is thereby compressed to some extent. In this second state hot water and/or steam is guided under increased pressure, typically in the order of magnitude of between 5 and 15 bar, from the inlet means through the decoction chamber and the ingredient compressed therein and leaves the decoction chamber via the dispensing means. From the dispensing means the thus prepared beverage is guided to a cup, beaker or other container of the user in order to be taken away.

Once the desired beverage has thus been prepared, the spindle performs an opposite rotation in order to impart to the decoction chamber an axial movement in opposite direction. A spring tension eventually develops here between the movable piston and a fixed part of the decoction device which forces the movable piston to a free outer end of the decoction body in order to scrape from the chamber wall all ingredient possibly left behind thereon. This movement continues until a third state is reached in which the decoction chamber lies wholly clear of the fixed bottom and a remaining pellet of the ingredient just used falls out between the two bottoms under the influence of gravitational force. Finally, the spindle performs a subsequent rotation to return the decoction chamber to its starting position, wherein the supply opening once again lies between the two bottoms and the chamber is ready to receive a subsequent quantity of ingredient for the purpose of a following preparation cycle.

Although the known device undeniably provides great convenience of use, it does have the drawback that the decoction chamber has to follow a path inside the decoction device in the order of twice its own length between the position at which the beverage is prepared and the position at which the used ingredient is released. The decoction device is therefore relatively long, this imposing limits on the minimum dimensions thereof and on the device as a whole.

The present invention has for its object, among others, to provide an apparatus for preparing a beverage and a decoction device which can be more compact.

In order to achieve the stated objective an apparatus for preparing a beverage of the type described in the preamble has the feature according to the invention that between the second state and the third state the decoction body has undergone a displacement in the first direction relative to a second of the two bottoms and that in the third state a first of the two bottoms lies outside the decoction body. Other than in the known device the first of the two bottoms, instead of remaining always inside the decoction body, lies outside the decoction body in the third state. In order to enable removal from the decoction chamber of used ingredient possibly left behind therein after preparation, the decoction chamber is displaced in the first direction relative to the second bottom until the space between the two bottoms lies wholly, or at least largely, outside the decoction chamber and a possible residue of the ingredient can be released. The decoction device need not therefore provide any space in an opposite direction for this purpose, whereby the decoction device, and thereby the apparatus as a whole, can be shorter and more compact.

In a particular preferred embodiment the apparatus according to the invention has the feature that during operation the drive means impart from the first state an at least substantially shared first stroke in the first direction to the first bottom and the decoction body, that between the second state and the third state the drive means subject at least the decoction body to a second stroke in the first direction which moves the decoction body away from the first bottom and carries the filling opening beyond the second bottom, that in a third stroke in the second direction the drive means bring together the first bottom and the decoction body and return the decoction device to the first state. A complete preparation cycle can thus be performed in only three strokes with a comparatively exceptionally compact decoction device.

In order to enhance a complete and reliable release of a residue of the ingredient from the decoction chamber following preparation of the beverage, a further preferred embodiment of the apparatus according to the invention has the feature that after the second state the drive means impart to the first bottom a displacement in the second direction which drives the first bottom and the second bottom apart. The first bottom is thus retracted to some extent from the residue of ingredient which will normally have been compressed to a more or less cohesive pellet between the two bottoms. This will enhance a later release thereof from the decoction chamber. The two bottoms need only move apart slightly for this purpose, whereby this displacement of the first bottom is considerably shorter than the first stroke.

A further particular preferred embodiment of the apparatus according to the invention has the feature that in the second state the first bottom has moved closer to the second bottom axially in the first direction. The ingredient is thus pressed by the first bottom against and onto the second bottom. The thus formed pellet will hereby adhere against the second bottom to a certain extent, which situation is maintained in the second and third states in which the decoction body has been displaced in the same first direction over the second bottom. The cohesion in the pellet is thus preserved to a large extent, thereby allowing the ingredient to be removed more easily and completely in the third state.

With a view to strength and stability a further preferred embodiment of the apparatus according to the invention has the feature that the drive means engage on a bottom body from which the first bottom extends, and that a transmission is provided between the bottom body and the decoction body. As a result of the transmission between the bottom body and the decoction body a partially individual path can nevertheless be imparted thereto using shared drive means. In this embodiment there is advantageously direct engagement on the bottom body which is embodied sufficiently solidly and robustly for this purpose.

In a further particular embodiment the apparatus is further characterized here in that the drive means comprise at least one screw spindle which engages in a threaded aperture provided outside the bottom in the bottom body, in particular a pair of screw spindles which engage in threaded apertures on either side of the bottom which are received to the side of the second bottom in a second bottom body comprising the second bottom. Such a direct transmission between the two bottom bodies of the play of forces occurring during operation provides for an exceptionally balanced, and therefore mechanically favourable distribution thereof in the decoction device.

The transmission between the bottom and the decoction body can be embodied in various ways. A particular embodiment of the apparatus according to the invention has in this respect the feature that the transmission comprises a gear ring which extends for rotation about a rotation shaft from a first of the bottom body and the decoction body and which engages on an axially straighter, in particular linear toothing extending from another of the bottom body and the decoction body. Because the toothing is straighter than the gear ring, a greater displacement axially will be imparted by the toothing than by the gear ring. This difference in axial path length is advantageously utilized to drive apart the decoction body and the first bottom in a shared stroke and to bring them together again in a shared stroke.

In order to hereby realize a relative displacement between the first bottom and the decoction body a further particular embodiment of the apparatus according to the invention has the feature that in the second stroke which drives the decoction body and the first bottom apart the gear ring is set into a first rotation about the rotation shaft, and that in the third stroke which returns the decoction device to the first state the gear ring performs a second rotation in opposite direction about the rotation shaft whereby the decoction body and the first bottom are brought together. During the first rotation the gear ring thus forces the first bottom and the decoction body apart over the same distance through which the two parts of the apparatus are brought together during the second rotation in order to return to their starting position.

A further particular embodiment of the apparatus according to the invention is characterized in that the first bottom is rotatable about a central axis inside the decoction chamber and that the drive means are coupled to the first bottom in order to set this bottom into a rotation about the central axis during the first stroke. The rotation thus imparted to the first bottom while it moves closer to the second bottom enhances a more uniform distribution of the ingredient over the surface of the bottoms, and thereby the quality of the beverage finally prepared therefrom.

The inlet and dispensing means can be provided per se in diverse ways, although a particular embodiment of the device according to the invention has the feature that the first bottom at least partially comprises the inlet means and that the second bottom at least partially comprises the dispensing means. The preparation liquid thus enters the decoction chamber via the first bottom and leaves the decoction device via the second bottom after having been in contact with the at least one ingredient. A filter provided for this purpose in the second bottom avoids undissolved ingredient being entrained in the liquid flow and unintentionally escaping from the decoction chamber via the dispensing means.

When the decoction device is applied horizontally, i.e. transversely of the direction of the force of gravity, a used quantity of ingredient can be released from the decoction chamber under the influence of gravitational force once it has been opened for this purpose. If on the other hand a vertical arrangement of the decoction device in the apparatus is opted for, or greater certainty is desired in the actual release of the product, a further particular embodiment of the apparatus according to the invention provides a solution. This is characterized for this purpose in that ejecting means are provided which are able and configured, when actuated in the third state, to displace a residue of the ingredient possibly remaining between the two bottoms, and more particularly in that the ejecting means comprise an arm which is arranged close to an outer end of the decoction body for rotation about a shaft and which outside the third state is carried into a starting position and acquires a bias, and in the third state is released in order to swing between the two bottoms. The ejecting means thus force possibly remaining ingredient out of the decoction chamber after it has opened.

The invention also relates to a decoction device of the type as applied in the preparation apparatus according to the invention as described above and will now be further elucidated with reference to the drawing. In the drawing:

FIG. 2A1-C6 show schematically the operation of a decoction device of the apparatus of FIG. 1 at successive stages of operation;

FIG. 4A1-C6 show the decoction device of FIG. 3 in the successive stages of operation.

The figures are otherwise purely schematic and not always drawn to scale. Some dimensions in particular may be exaggerated to greater or lesser extent for the sake of clarity. Corresponding parts are designated in the figures with the same reference numeral.

Figure 1:
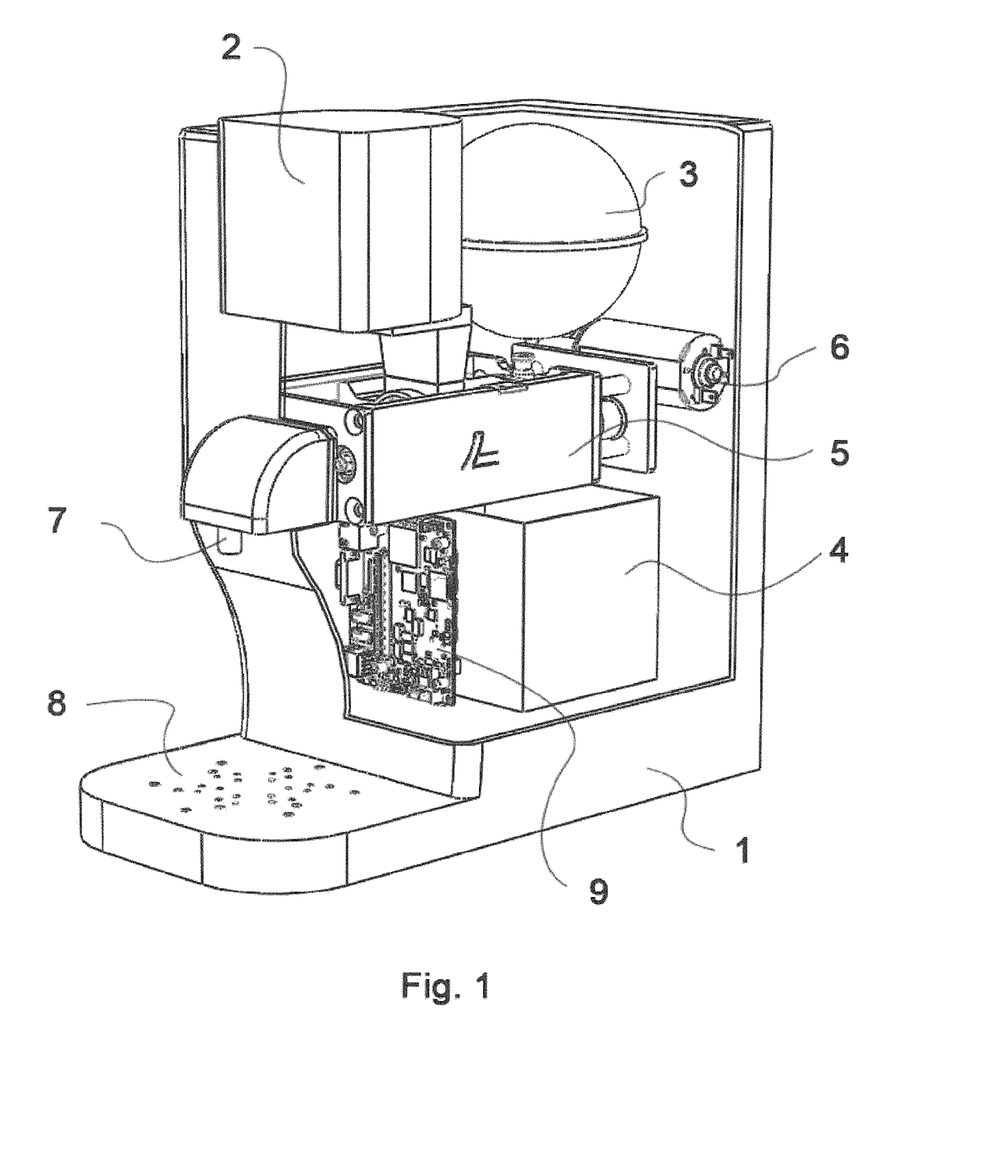
FIG. 1 is a perspective schematic view of a construction of an apparatus according to an exemplary embodiment of the invention.

FIG. 1 shows an exemplary embodiment of an apparatus according to the invention. This is a fully automatic espresso machine with which espresso coffee and beverage products optionally derived therefrom can be prepared from coffee beans or ground coffee powder. For this purpose the apparatus comprises an elegant housing for accommodating a bean reservoir with coffee grinder 2 which is usually provided with a parallel infeed channel for ground coffee. Further provided in the housing is a water boiler 3 with which a supply of hot water is maintained. A so-called thermal block can also be applied instead, i.e. a throughflow device which increases the temperature of water flowing therethrough. In the shown example the apparatus further comprises a water reservoir 4 for cold water which can optionally be supplemented or replaced by a fixed water connection.

For the preparation of espresso coffee the apparatus is provided with a decoction device 5, also referred to as decoction group, which performs all preparation steps required therefor. Decoction device 5 is driven by an electric motor 6 and dispenses the prepared product at an outflow 7 from which the prepared product can be taken away. A leakage tray serves to collect possible leaked water and as platform for receiving thereon a cup or beaker in which the product is received. The whole process is closely monitored and controlled by a control unit 9 which is embodied as insert printed circuit board so as to enable quick and easy replacement and exchange in the case it fails.

Figure 2:
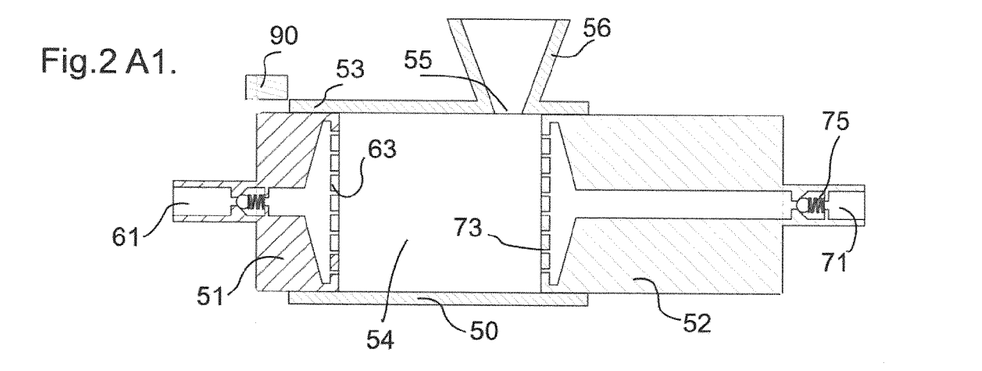

Decoction device 5 of the apparatus according to the invention is shows schematically in FIG. 2 in successive stages of operation. The decoction device comprises a first bottom or piston 51 and a second bottom or piston 52 which are movable inside a decoction body 50 and together enclose a decoction chamber 54. A chamber wall 53 of the decoction chamber comprises locally a filling opening 55 which opens into the decoction chamber and makes it possible to introduce coffee powder into the decoction chamber. Filling opening 55 is provided for this purpose with supply means 56 in the form of a filling funnel which receives coffee powder from an outlet of coffee grinder 2, see FIG. 1, or from the parallel inlet for ground coffee not further shown in FIG. 1.

In this example the first bottom 51 takes a displaceable form and the second bottom is in stationary position, although variations hereof are possible within the scope of the invention. The first bottom 51 is provided in this example with an inlet 61 for hot water which has been drawn from the boiler and optionally brought under increased pressure in the order of 6-15 bar using a pump (not shown) in order to finally realize a desired froth layer on the espresso. A filter 63 in first bottom 51 ensures that coffee powder cannot leave decoction chamber 54 on this side.

Second bottom 52 is also provided with a fine-mesh filter 73 for blocking coffee powder while the prepared product is allowed through. An outlet valve 75 guarantees an adequate pressure buildup in the chamber while the espresso is being decocted. An outlet 71 on the second bottom is in more or less direct connection with outflow 7 for the purpose of dispensing the prepared product.

The decoction device performs a strictly controlled preparation cycle during operation. This cycle is shown schematically in FIG. 2 and begins with a first starting state indicated with A1 in FIG. 2. In this state coffee powder 80 is admitted into decoction chamber 54 via filling opening 55 in the chamber wall until a desired filling (stage A2) has been reached.

From this stage (FIG. 2A2) the decoction device performs a first stroke (FIG. 2B1) wherein the first bottom 51 performs a displacement together with the decoction chamber in a first direction R1. This displacement continues until first bottom 51 has moved a relatively short distance from second bottom 52 and coffee powder 80 has been compressed into a solid pellet 85, see FIG. 2B2. It is also important that in this second state B2 of the preparation cycle filling opening 55 now lies outside decoction chamber 54 in the first direction R1 so that decoction chamber 54 is closed in at least substantially leak-tight manner. Both bottoms 51,52 lie here in at least substantially leak-tight manner against wall 53 of decoction chamber 54.

In this second state as shown in FIG. 2B2 hot water is admitted via inlet 61 into the decoction chamber. This water has been drawn from boiler 3 and brought with pump means (not shown) to an increased pressure in the order of 10 bar. A fine-mesh screen 63 in first bottom 51 ensures that water can enter freely but that coffee powder 85 cannot leave the decoction chamber. A similar screen 73 in the second bottom fulfils a similar function on the outlet side. A valve 75 is moreover accommodated in outlet 71 whereby the pressure in decoction chamber 54 can rise sufficiently. The admitted water forces its way through decoction chamber 54, and thereby through the compressed coffee 85 present therein, wherein an extraction process under about said pressure takes place which produces the desired espresso coffee with an attractive froth layer. This extraction product leaves the decoction chamber via screen 73 and the outlet in second bottom 52 and finally appears at outlet 7 where it can be removed for the purpose of consumption. The process is fully controlled by a microprocessor board 9 which is provided for this purpose and which particularly monitors a time duration of this preparation step.

Once the product has been thus prepared, a displacement in a second direction R2 opposite to the first direction R1 is imparted to the first bottom, see FIG. 2C1, whereby release between first bottom 51 and the residue 85 of the coffee will take place, which will enhance a later integral removal of the coffee residue. In this exemplary embodiment optionally the same displacement in the first direction R1 is moreover also imparted to decoction body 50 relative to first bottom 51 so that both parts move away from each other through the sum of the two displacements, see FIG. 2C2. First bottom 51 eventually lies wholly clear of decoction body 50, see FIG. 2C2.

The decoction device subsequently imparts a second stroke in the first direction R1 to first bottom 51 and the decoction body, see FIG. 2C3, wherein the decoction body is displaced in the first direction R1 relative to second bottom 52 until the third state shown in FIG. 2C3 is reached. In this third state, FIG. 2C3, an intermediate space 58 between the two bottoms 51,52 is located at least substantially wholly outside the decoction body so that a residue of the supplied ingredient 85 possibly still remaining therein can be evacuated therefrom.

Close to an edge of decoction body 50 ejecting means 90, for instance in the form of a pivot arm, can be provided for this purpose which in this third state enter the intermediate space 58 for forced ejection of a residue of the coffee powder, see FIG. 2C4. The used coffee is normally collected in a collecting container provided for the purpose which is periodically emptied. Such forced ejecting means 90 are essential in the case the decoction device is disposed vertically. In the case of a horizontal placing the residue will usually already drop out of intermediate space 85 under the influence of gravitational force, although this is ensured by also providing such ejecting means 90 in this situation.

Ejecting means 90 are moved back to their starting position, see FIG. 2C5, and a shared third stroke in the second direction R2 is imparted to the decoction body and the first bottom, wherein decoction body 50 moves up to the first bottom, see FIG. 2C6, and they are finally brought together again in the starting position of FIG. 2A1. Filling opening 55 now opens freely again into decoction chamber 54 which is closed on either side by respectively first bottom 51 and second bottom 52. The decoction device is thus once again ready for a subsequent preparation cycle.

Figure 3:
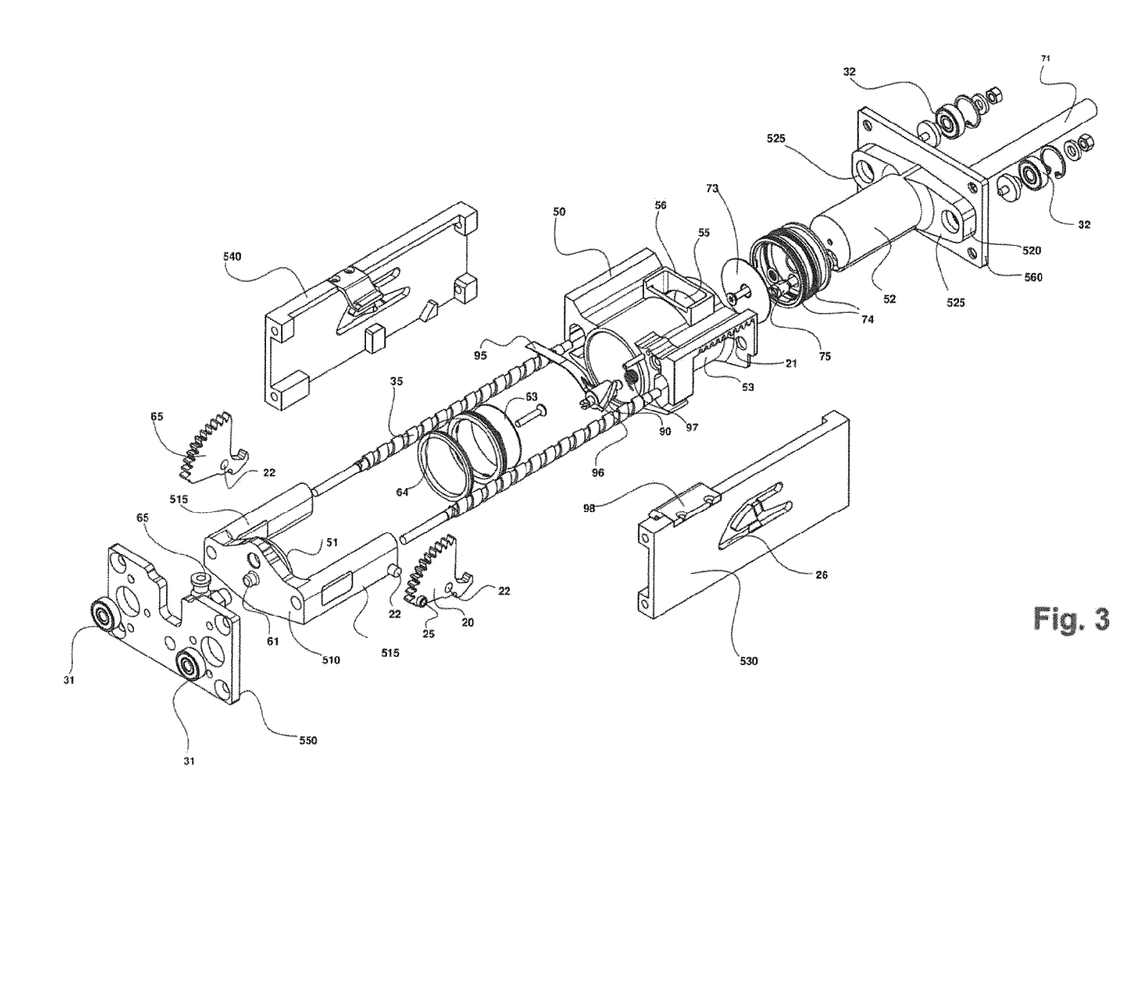
FIG. 3 shows an exploded view of an exemplary embodiment of a decoction device according to the invention as applied in the apparatus of FIG. 1.

A specific embodiment of a decoction device according to the invention as applied in the apparatus of FIG. 1 is shown respectively in FIG. 3 in an exploded view and in FIGS. 4A1-4C6 in the above described successive stages of operation.

With a view to durability, dimensional stability, reliability and wear resistance the components of the decoction device are, where possible and useful, embodied in stainless steel, although with a view to cost-saving and weight-saving at least partial use can optionally also be made for this purpose of another material, and in particular a suitable plastic. It is noted here that the applied materials and dimensions of the components are of secondary importance within the context of the invention and can be varied by a skilled person at his/her discretion.

Decoction device 5 of FIG. 3 extends substantially between a first bottom body 510, from which a first bottom 51 extends, and a second bottom body 520, from which a second bottom 52 extends. The decoction device is bounded laterally by a pair of side parts 530, 540. The second bottom body 520 also comprises, in addition to second bottom 52, the outlet 71. A hose coupling 65 is connectable on the one hand via a flexible conduit to liquid inlet 61 in the first bottom body 510 and can on the other hand be connected by a water hose or water conduit (not shown) to a boiler 3.

First bottom 51 comprises a screen body 63 connected via a spacer and sealing ring to the first bottom body 510, so forming an inlet chamber. The inlet chamber enhances a uniform distribution of admitted water over the surface of the screen body. Likewise provided on the second bottom at an outlet side is a screen body 73 which is here also held at a distance by a sealing ring and spacer so that a hollow chamber is formed behind it. The prepared beverage can thus be drawn off over the whole surface of screen body 73 and settle to some extent, this enhancing the quality of the beverage. A pressure valve 75 protrudes into the outlet so as to allow an adequate pressure increase in the decoction device.

The core of the decoction device is further formed by a decoction body 50 having therein a decoction chamber 54 in which the first bottom 51 and second bottom are movably received in close-fitting manner. Sealing rings 64,74 provide here for and at least substantially leak-tight fit. A chamber wall 53 of decoction body 50 comprises locally a filling opening 55 which is provided with a filling funnel 56 for the purpose of receiving in at least one ingredient for a beverage to be prepared, in this case ground coffee. Filling funnel 56 is for this purpose in direct connection with an outlet of coffee grinder 2 of the apparatus in which the decoction device is applied and often also with an outlet of a parallel inlet for pre-ground coffee. Provided close to an outer end of decoction body 50 are ejecting means 90 in the form of an ejector arm 95 which extends from a base 96 connected for pivoting about a pivot shaft to decoction body 50 and which lies during operation under bias of a spiral spring 97.

Driving of the decoction device is provided by a motor unit accommodated externally of the decoction device elsewhere in the apparatus. The motor engages via a gear transmission (not shown) on the free outer ends of a pair of screw spindles 35 which are received movably on the one hand in a pair of threaded apertures 515 on either side of first bottom 51 in the first bottom body 510 and on the other in a pair of thrust bearings 525 provided on either side of the second bottom 52 in the second bottom body 520. Spindles 35 are bearing-mounted here in respectively a motor plate 550 and an end wall 560 via ball bearings 31,32.

Side parts 530, 540 form, together with motor plate 550 and end wall 560, fixed parts of decoction device 50. The second bottom body 520 is also arranged stationary in the decoction device and connected fixedly to the end wall for this purpose. The first bottom part 510 and decoction body 50 are on the other hand axially movable along a central axis of decoction chamber 54. In the first instance the motor drive is transmitted directly here to the first bottom body 510 via screw spindles 35 and threaded apertures 515. A transmission is in turn provided between bottom body 510 and decoction body 50, whereby decoction body 50 is also coupled indirectly to the movement of the screw spindles.

This transmission comprises on the one hand a gear ring 20 which extends for rotation about a pivot shaft 22 from the first bottom body 510. Gear ring 20 engages on a linear toothing 21 provided on a wall of decoction body 50. A protrusion 25 on gear ring 20 is here received slidably in a specific groove assembly 26 which is arranged in the wall of one of the side parts 530,540 and which during operation imparts to gear ring 20 a unique path passing through the above described states and strokes. This will be elucidated below with reference to FIGS. 4A1-4C6.

In the state shown in FIG. 4A1 the decoction device 50 is in the starting position of FIG. 2A1. First bottom 51 is now situated at a relatively great distance from second bottom 51 inside decoction body 50, and the decoction chamber is enclosed therebetween. The opening 55 in the chamber wall of the decoction chamber now opens freely into the decoction chamber so that a quantity of ground coffee can be admitted via supply funnel 56.

Screw spindles 35 subsequently force first bottom 51 and decoction body 50 to the second bottom in a shared first stroke in the first direction, see FIG. 4B2. This compression stroke is followed in groove assembly 26 in a side part 530,540 of the decoction device by protrusion 25 of gear ring 20. The path followed by the protrusion is indicated with an arrow in the detail drawing of FIG. 4A1.

In FIG. 4B1 the decoction device 50 is in the second state of FIG. 2B1 in which the actual preparation process takes place. The admitted coffee is now compressed to form a compact pellet between the two bottoms 51,52, and supply opening 55 in the wall of the decoction chamber is now located beyond the second bottom in the first direction so that the decoction chamber is closed in leak-tight manner. In this second state hot water is admitted under high pressure via inlet 65 into the decoction chamber, and coffee extract will flow out of outlet 71.

Once the preparation step has been completed, spindles 35 perform a rotation in the opposite direction, wherein protrusion 25 of gear ring 20 is forced into the path indicated in FIG. 4B2. A difference in groove depth in groove assembly 26 imparts this path to protrusion 25. The gear ring is urged here into a rotation about pivot shaft 22 and the gear ring and the linear toothing 21 displace in axial direction relative to each other in decoction body 50. Because linear toothing 21 is axially straighter than gear ring 20, this has the result that first bottom 51 will make a markedly greater axial displacement in the opposite second direction than decoction body 50.

Owing to this displacement of first bottom 51 the first bottom 51 moves clear of the compressed coffee in the decoction chamber, see also FIG. 2C2, and the decoction device enters the state shown in FIG. 4C2.

Figure 4:
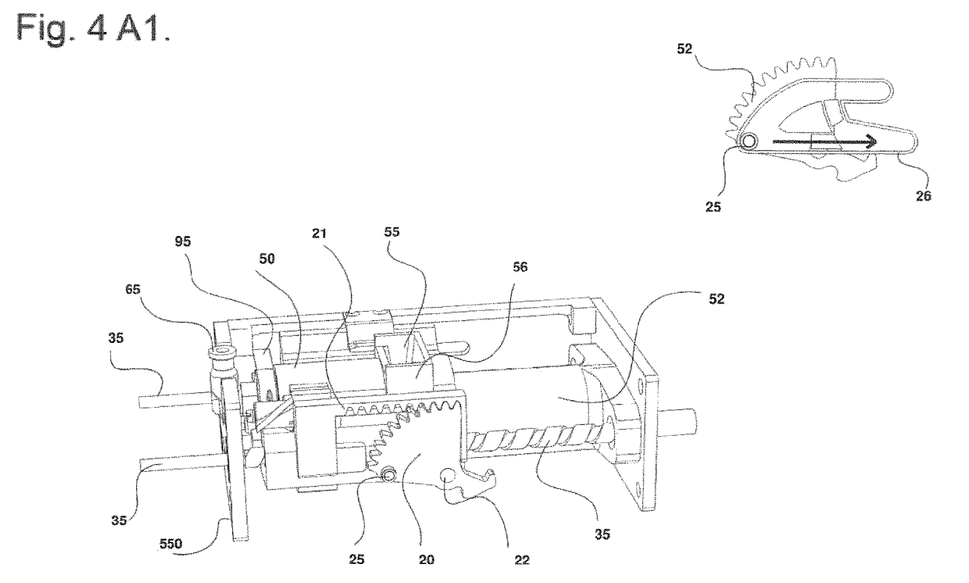

From here the spindles 35 once again perform a rotation in the first direction, wherein protrusion 25 follows roughly the path shown in FIG. 4C2. Decoction body 50 is driven here wholly beyond an outer end of second bottom 52 directed toward the decoction chamber. In this third state a space between the two bottoms 51,52, just as the first bottom 51 itself, now lies wholly clear outside decoction body 50. Ejecting means 90 are released, whereby ejector arm 95 will make a stroke through this intermediate space, see FIG. 4C4. A residue of the coffee which has possibly not yet fallen out under the influence of gravitational force is thus effectively removed.

Spindles 35 subsequently perform a rotation in the second direction, wherein first bottom 51 and the decoction chamber are driven back in a substantially shared third stroke to the starting situation of FIG. 4A1. The protrusion follows the upper groove of groove assembly 26 here as shown successively in FIGS. 4C4-4C6. This path is initially linear, but from the situation shown in FIG. 4C5 the path imparted to protrusion 25 runs in a curve. The gear ring is urged here into a rotation in opposite direction, whereby gear ring 20 and linear toothing 21 once again undergo axial displacement relative to each other, albeit in opposite directions. Decoction body 50 thus moves up to first bottom 51 and eventually comes together with the first bottom, FIG. 4C6, and moved back in joined state to the starting position of FIG. 4A1.

Ejector arm 95 is simultaneously driven back here to its starting position under spring tension 75 as a result of engagement of a spiral groove in base part 96 of the arm which engages on a projecting part 98 on a fixed wall of the decoction device.

Although the invention has been further described above on the basis of only a single exemplary embodiment, the invention is by no means limited thereto. On the contrary, many variations and embodiments are still possible within the scope of the invention.

Use is thus made in the given exemplary embodiment of a displacement and movement of the first bottom and the decoction body away from each other between the second and third states. It is instead optionally possible to dispense with this, whereby the number of strokes or displacements of the decoction device can be limited.

The transmission between the first bottom body and the decoction body, although very advantageous as indicated in the exemplary embodiment, is not exhaustive. The transmission can instead be realized in other manner, for instance by means of a suitable assembly of levers and arms, and a direct drive of the two components can also be envisaged within the scope of the invention.

If a one-to-one transmission is present between the first bottom part and the decoction body and the movement apart and toward each other as described in the embodiment does not come about, a similar movement apart and toward each other can be brought about by means of imparting one or more additional strokes to the decoction device.

The invention will always retain the advantage of an exceptionally compact and operationally reliable decoction device in or for an apparatus for preparing a beverage, in particular espresso coffee and/or coffee products derived therefrom.

The invention claimed is:

1. An apparatus for preparing a beverage, comprising a decoction device for performing a beverage preparation cycle, said decoction device comprising a decoction body having a decoction chamber that is surrounded by a chamber wall and that extends axially between a first bottom and a second bottom of said decoction device that lie opposite each other,
   wherein said first bottom and said second bottom are received for axial movement inside said chamber wall,
   wherein said chamber wall is provided locally with a filling opening for admitting into the decoction chamber at least one ingredient for the beverage to be prepared,
   wherein the decoction chamber is provided with an inlet for admitting a liquid under increased pressure and temperature,
   wherein the decoction chamber is provided with a dispenser for dispensing a beverage prepared from the liquid and the at least one ingredient,
   wherein the decoction device further comprises a drive mechanism coupled to the decoction body and wherein the apparatus further comprises a motor configured to power the drive mechanism,
   wherein the decoction body is driven during operation by the driving mechanism to impart said preparation cycle to the decoction device, said preparation cycle comprising:
   a first state in which the filling opening opens into the decoction chamber and is situated between said first bottom and said second bottom;
   a second state in which said first bottom and said second bottom have moved closer to each other inside the chamber wall and the liquid is guided through the decoction chamber;
   a third state in which a space between said first bottom and said second bottom lies next to the chamber wall exposing a possible residue of said at least one ingredient thus allowing the decoction chamber to get rid of said residue,
   wherein said first bottom and said second bottom are both located at a first side of said filling opening in said second state,
   wherein said first bottom and said second bottom are both located at said first side of said filling opening in said third state, and
   wherein moving said decoction device from said second state into said third state comprises driving said chamber wall of said decoction body in a first direction, away from said first bottom and said second bottom, and over at least one of said first bottom and said second bottom, until said space between said first bottom and said second bottom lies at said first side of said filling opening outside said chamber wall.

2. The apparatus as claimed in claim 1,
   wherein, during operation, said first bottom and said chamber wall both carry out a first stroke in said first direction while the decoction device is driven from said first state into said second state, wherein between the second state and the third state the chamber wall carries out a second stroke in said first direction which moves the chamber wall away from the first bottom, and wherein said chamber wall carries out a third stroke in a second direction, opposite said first direction, towards the first bottom to return the decoction device to the first state.

3. The apparatus as claimed in claim 2, wherein the first bottom is subjected to a displacement in the second direction while the decoction device moves from the second state to the third state, driving the first bottom and the second bottom apart.

4. The apparatus as claimed in claim 1, wherein in the second state the first bottom has moved closer to the second bottom axially in the first direction.

5. The apparatus as claimed in claim 2, wherein said first bottom is part of a bottom body, wherein the drive mechanism engages on said bottom body, and wherein a transmission is provided between the bottom body and the chamber wall.

6. The apparatus as claimed in claim 5, wherein the drive mechanism comprises at least one screw spindle which engages in a threaded aperture in the bottom body.

7. The apparatus as claimed in claim 5, wherein the transmission comprises a gear ring which extends for rotation about a rotation shaft and engages on a toothing that is axially straighter than the gear ring.

8. The apparatus as claimed in claim 7, wherein in the second stroke, during which the chamber wall and the first bottom are driven apart, the gear ring is set into a first rotation about the rotation shaft, and that in the third stroke, during which the decoction device returns to the first state, the gear ring performs a second rotation in an opposite direction about the rotation shaft whereby the chamber wall and the first bottom are brought together.

9. The apparatus as claimed in claim 2, wherein the first bottom is rotatable about a central axis inside the decoction chamber and the drive mechanism is coupled to the first bottom in order to set this bottom into a rotation about the central axis during the first stroke.

10. The apparatus as claimed in claim 1, wherein the first bottom at least partially comprises the inlet and the second bottom at least partially comprises the dispenser.

11. The apparatus as claimed in claim 1, wherein an ejector is provided which is able and configured, when actuated in the third state, to displace a residue of the ingredient possibly remaining between the two bottoms.

12. The apparatus as claimed in claim 11, wherein the ejector comprises an arm which is arranged close to an outer end of the decoction body for rotation about a shaft and which outside the third state is carried into a starting position and acquires a bias, and in the third state is released in order to swing between the two bottoms.

13. The apparatus as claimed in claim 6, wherein said at least one screw spindle comprises a first screw spindle that engages a first threaded aperture at a first side of said pair of bottoms and a second screw spindle that engages a second threaded aperture at a second side of said pair of bottoms, said second side being opposite said first side, and wherein said first and second screw spindle are received to the respective side of the second bottom in a second bottom body that comprises the second bottom.

14. The apparatus as claimed in claim 7, wherein said toothing is a linear toothing.

* * * * *